United States Patent Office 3,293,277
Patented Dec. 20, 1966

3,293,277
BORON-CONTAINING POLYMERS AND METHOD
OF PREPARING THE SAME
Robert J. Convery, Wilmington, Del., assignor to Sun Oil
Company, Philadelphia, Pa., a corporation of New
Jersey
No Drawing. Filed Jan. 30, 1964, Ser. No. 341,395
5 Claims. (Cl. 260—462)

This application is a continuation-in-part of copending application Serial No. 63,969, filed October 21, 1960, now abandoned.

This invention relates to novel boron-containing polymers and to a method of preparing the same by reacting a specific isomer of cyclododecatriene with diborane either in the presence or absence of a free oxygen-containing gas.

It is known that cyclododecatriene-1,5,9 can be prepared by contacting butadiene with a catalyst formed from titanium tetrachloride and diethyl aluminum chloride in a hydrocarbon solvent. This catalyst system produces the trans-trans-cis form of the triene exclusively. It is also known that cyclododecatriene-1,5,9 can be prepared by contacting butadiene with a catalyst system which is aluminum triethyl together with either chromyl chloride or chromic chloride in a hydrocarbon solvent. The latter type of catalyst system produces mainly the trans-trans-trans form of the triene but also causes the formation of substantial amounts of the trans-trans-cis isomer.

The trans-trans-trans isomer of cyclododecatriene-1,5,9 can be reacted with diborane to produce an addition product in which a single boron atom is attached at the 1,5,9-positions to a single cyclododecane ring. The product is a non-polymeric liquid having the formula $C_{12}H_{21}B$.

Polymeric materials containing boron have been prepared heretofore by reacting cyclododecatriene-1,5,9 with a diborane-amine complex. This preparation can be done in the presence of a solvent. Examples of complexes which have been used in such reactions are those prepared by reacting a stoichiometric amount of diborane with a di- or tri-lower alkyl amine such as diethylamine or triethylamine. The complex produced is then a borine-alkyl amine. These materials are colorless liquids, stable in air, miscible with organic solvents, but immiscible with water. The most commonly used complex is borine-triethylamine and is used as a convenient laboratory source of the $BH_3$ radical.

In Greenwood et al., "Journal of the Chemical Society," page 2922 et seq., July 1960, it is stated that in the reaction between cyclododecatriene-1,5,9 and diborane there is produced a polymer and a tricyclic monomer having the following formula:

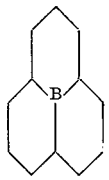

It is also stated therein that the yield of monomer was poor when diborane was added directly to the cyclododecatriene at temperatures between 20° C. and 100° C. The main product was reported as being polymer. The yield of monomer increased when the reaction was carried out in trimethylamine and particular improvement was noted when triethylamine was used as a solvent. The yield of monomer increased still further when cyclododecatriene was treated with separately prepared borine-triethylamine in carbon tetrachloride and almost quantitative production of the monomer occurred at 110° C. in light petroleum ether or 2,2'-dimethoxy-diethyl ether.

In accordance with the instant invention it has now been found that a specific isomer of cyclododecatriene-1,5,9, namely the trans-trans-cis form, can be reacted with diborane in the presence of a specific type of solvent to yield a polymeric product containing only carbon, hydrogen, and boron or can be reacted with diborane in the presence of a minor amount of a free oxygen-containing gas to yield a polymeric product containing carbon, hydrogen, boron, and oxygen. The novel polymeric materials produced in accordance with this invention have a plurality of cyclododecatriene molecules and boron atoms combined in each molecule. The polymers vary form viscous liquids to amorphous solids. The polymers containing either carbon, hydrogen, and boron or carbon, hydrgen, boron, and oxygen are useful in the preparation of shields for nuclear reactors. The hydrocarbon portion of the molecule, derived from cyclododecatriene, is capable of slowing up the thermal neutrons from the reactor and the boron is capable of absorbing the resulting low energy neutrons. Hence the product of the invention has the advantage of providing both a decelerator for thermal neutrons and a neutron absorbent contained within a single substance.

According to the invention a boron-containing polymeric product is prepared by contacting the trans-trans-cis isomer of cyclododecatriene-1,5,9 with diborane in the presence of an oxygen containing non-nitrogenous Lewis base and either in the presence or absence of a minor amount of a free oxygen-containing gas. The copolymerization reaction occurs readily and is exothermic. The temperature generally should be maintained in the range of 0°–150° C. and the molar proportion of diborane to cyclododecatriene preferably should be at least 0.5. The reaction mixture rapidly becomes viscous as the polymeric material is formed. Completion of the reaction is indicated when the release of heat of reaction ceases. After the reaction is complete, the desired polymeric product is recovered by evaporating the Lewis base and any unreacted cyclododecatriene, preferably under reduced pressure.

The recovered product is a highly viscous liquid, gummy semi-solid or amorphous solid, with the proportion of carbon atoms to boron atoms varying depending upon the particular reaction conditions employed. Higher temperatures and higher diborane to cyclododecatriene ratios tend to decrease the carbon to boron atoms ratio in the product. Generally the ratio of the numbers of carbon atoms to boron atoms lies in the range of 7–16.

When preparing the polymeric materials of this invention which contain carbon, hydrogen, boron, and oxygen it is important that the reaction be conducted in the presence of a minor amount of a free oxygen-containing gas. By "minor amount of a free oxygen-containing gas" is meant that the total amount of free oxygen in the reaction system is less than about 1.5 mol percent, preferably less than about 1.0 mol percent. These limitations are imposed due to the fact that diborane will react explosively in the presence of additional amounts of oxygen.

The purpose of the presence of the oxygen-containing non-nitrogenous Lewis base is to activate the diborane so that attack upon the hydrocarbon double bonds can occur. Any oxygen-containing non-nitrogenous Lewis base is suitable for this purpose and only a small amount is required to activate the diborane. It is critical to the success of this invention that the Lewis base conform to the definition set forth above. If other types of Lewis bases containing nitrogen, such as various alkyl amines, alkanol amines, or ammonia are employed the product will not be the desirable polymeric material but rather will be a monomer such as that produced by the method of Greenwood et al. supra. Generally it is desirable to use an oxygen-containing non-nitrogenous Lewis base in which the hydrocarbon and also the copolymer product will be soluble and to employ a large enough amount of the base to prevent the reaction mixture from becoming excessively viscous. The following are examples of Lewis bases that can be employed: monoglyme, diglyme, triglyme, ethyl ether, n-butyl ether, and amyl ether.

The following examples illustrate the invention more specifically.

Example I

A three-neck reaction flask, provided with a tube for introducing gaseous diborane adjacent the flask bottom, a reflux condenser and a magnetic stirrer, was charged with a solution of 40.5 g. (0.25 mole) of trans-trans-cis cyclododecatriene-1,5,9 in 35 ml. of diglyme. With the mixture at room temperature and under an atmosphere of nitrogen, diborane was bubbled into the solution. Reaction started immediately and the temperature rose to about 50°–60° C. at which level it was maintained by regulating the addition of diborane to a slow rate. The mixture began to become viscous almost immediately. A total of 0.136 mole of diborane was introduced. The polymeric product was recovered by evaporating the diglyme under a vacuum and maintaining the residue in vacuuo at 100°–140° C. for 48 hours. The hot residue was a viscous liquid which changed to a gummy semi-solid upon cooling. The yield of product obtained was 62.5% by weight based on the cyclododecatriene charged. It had an elemental analysis as follows:

| | Percent |
|---|---|
| C | 83.30 |
| H | 11.37 |
| B | 5.42 |

This corresponds approximately to an empirical formula of $C_{84}H_{132-138}B_6$.

Example II

Another run was made in a manner similar to that described in Example I except that in this case the temperature was allowed to rise to 100°–120° C. and the total amount of diborane added was 0.437 mole. The product had the following elemental analysis:

| | Percent |
|---|---|
| C | 79.3 |
| H | 12.0 |
| B | 8.7 |

This corresponds approximately to the empirical formula of $C_{24}H_{45}B_3$.

Example III

Another run was made in a manner similar to that described in Example I except that in this case the exothermic temperature rise was from about 26° C. to about 80° C., the total amount of diborane added was 0.7 mole and the reaction was conducted in an atmosphere of nitrogen containing about six percent air. The product was a yellow semi-solid. It had a molecular weight of about 600 and the following elemental analysis:

| | Percent |
|---|---|
| C | 75.23 |
| H | 11.59 |
| B | 4.60 |
| O (by difference) | 8.60 |

Substantially identical results are obtained when monoglyme, triglyme, ethyl ether, n-butyl ether or amyl ether are substituted for diglyme in the foregoing examples.

I claim:
1. Method of preparing a boron-containing polymeric product which comprises contacting the trans-trans-cis isomer of cyclododecatriene-1,5,9 with diborane in the presence of a minor amount of a free oxygen containing gas and an oxygen containing non-nitrogenous Lewis base as the sole Lewis base and separating a polymeric product from the reaction mixture.
2. Method according to claim 1 wherein said contacting is done at a temperature in the range of 0°–150° C.
3. Method according to claim 2 wherein the molar proportion of diborane to cyclododecatriene is at least 0.5.
4. A boron and oxygen containing polymeric material consisting essentially of the reaction product of the trans-trans-cis isomer of cyclododecatriene-1,5,9 with diborane in the presence of a minor amount of a free oxygen-containing gas and an oxygen-containing non-nitrogenous Lewis base as the sole Lewis base.
5. A material according to claim 4 wherein the ratio of the number of carbon atoms to the number of boron atoms is in the range of 7–16.

References Cited by the Examiner

UNITED STATES PATENTS 3,103,537  9/1963  Rutkowski _____ 260—606.5

FOREIGN PATENTS 586,412  11/1959  Canada.

OTHER REFERENCES

Greenwood et al.: Jorunal of the Chemical Society, pp. 2922–2927, July 1960.

TOBIAS E. LEVOW, *Primary Examiner.*

F. R. OWENS, *Examiner.*

W. F. W. BELLAMY, *Assistant Examiner.*